United States Patent [19]
Krishnan et al.

[11] Patent Number: 6,075,863
[45] Date of Patent: *Jun. 13, 2000

[54] INTELLIGENT COMMUNICATION DEVICE

[75] Inventors: Kalyan Krishnan, Fremont, Calif.;
George A. Keyworth, II, Santa Fe, N.Mex.

[73] Assignee: Encanto Networks, Fremont, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/694,529

[22] Filed: Aug. 9, 1996

Related U.S. Application Data

[60] Provisional application No. 60/012,447, Feb. 28, 1996.

[51] Int. Cl.[7] .............................. H04L 9/00; H03K 7/08; H04M 11/00
[52] U.S. Cl. .......................... 380/49; 375/222; 379/93.05
[58] Field of Search .............................. 380/49; 395/186, 395/187, 188; 713/200, 201, 202; 375/222; 379/93.17, 93.25, 93.05, 93.06; 348/14, 15

[56] References Cited

U.S. PATENT DOCUMENTS

| | | | |
|---|---|---|---|
| 4,484,025 | 11/1984 | Ostermann et al. | 380/49 |
| 4,984,271 | 1/1991 | Goto | 380/25 |
| 5,001,750 | 3/1991 | Kato et al. | 380/18 |
| 5,166,977 | 11/1992 | Ross | 380/18 |
| 5,319,776 | 6/1994 | Hile et al. | 395/575 |
| 5,388,211 | 2/1995 | Hornbuckle | 395/200 |
| 5,410,599 | 4/1995 | Crowley et al. | 380/9 |
| 5,499,296 | 3/1996 | Micali | 380/23 |
| 5,502,766 | 3/1996 | Boebert et al. | 380/25 |
| 5,546,463 | 8/1996 | Caputo et al. | 380/25 |
| 5,619,250 | 4/1997 | McClellan et al. | 348/10 |
| 5,651,068 | 7/1997 | Klemba et al. | 380/25 |
| 5,680,461 | 10/1997 | McManis | 380/25 |
| 5,692,047 | 11/1997 | McManis | 380/4 |
| 5,708,709 | 1/1998 | Rose | 380/4 |
| 5,727,147 | 3/1998 | Van Hoff | 395/200.3 |
| 5,737,607 | 4/1998 | Hamilton et al. | 395/701 |
| 5,740,441 | 4/1998 | Yellin et al. | 395/704 |
| 5,745,569 | 4/1998 | Moskowitz et al. | 380/4 |
| 5,754,857 | 5/1998 | Gadol | 395/680 |
| 5,765,205 | 6/1998 | Breslau et al. | 711/203 |
| 5,778,231 | 7/1998 | Van Hoff et al. | 395/705 |

OTHER PUBLICATIONS

"Fundamentals of Java Programming for the World Wide Web," by Aaron E. Walsh, chapter 4, 1996.
"Using Netscape 2," Mark R. Brown, ©1995 pp. 105–111 and 885–907.

*Primary Examiner*—Gail O. Hayes
*Assistant Examiner*—Hrayr A. Sayadian
*Attorney, Agent, or Firm*—Blakely, Sokoloff Taylor & Zafman LLP

[57] ABSTRACT

A communication device is provided that is controlled through the use of small programs or applets that are executed by a processor within the device. The applets are encoded as a sequence of instructions chosen from a general purpose, machine independent instruction set, such as Java bytecodes. These applets may be interpreted by software, or directly executed by the processor of the communication device. The applets may be loaded into the device from a local host computer or may be downloaded from a remote device or computer. Applets provide a convenient, hardware independent means for maintaining up to date communications protocols and for updating the device with new features and capabilities. Downloading applets from a remote device may, for example, provide automatic encryption capabilities on a session unique basis, or provide for automatic virus detection, thereby providing enhanced security in data communications. A direct connection between the communication device and the host computer's video subsystem provides accelerated video access for applets executing on the device.

14 Claims, 3 Drawing Sheets

INTELLIGENT COMMUNICATION DEVICE

Benefit of United States Provisional Application No. 60/012,447, filed Feb. 28, 1996, is claimed herefor."

BACKGROUND OF THE INVENTION

Modems provide a means for remote computers to communicate over the Public Switched Telephone Network ("PSTN"), and have been in use for several decades. While data transmission rates using analog modems have risen considerably over the past decades, from 120 bits-per-second (bps) to 28,800 bps, command and control technology has remained relatively static.

The de facto industry standard modem command set is the "Hayes AT-command set" created in the late 1970's. The AT-commands consist of an attention sequence, usually the characters 'AT', followed by a sequence of commands and terminated by a carriage return, wherein command sequences are comprised of one to three characters possibly with a data value. This procedural "one command at a time" technology does not provide much flexibility or adaptability in controlling operation of a modem. Nor does it provide for significant autonomous, intelligent, processing within the modem itself.

Some previously known modems provide "alterable" read only memory, such as Flash-ROM or EEPROM, so that the control and processing software in the modem may be updated as new code revisions are released. However, this is primarily intended as a means to fix bugs in modem software and to provide minor upgrades in modem features and capabilities. In addition, the software stored, for example, in the EEPROM, is intricately tied to the specific hardware used in the modem and is therefore highly machine dependent. Thus, software updates for one modem are unlikely to work with a different modem.

Modems are used to connect a user's computer to a remote computer. Recently, the Internet has become an important medium of communication, and the world wide web (web) has become an important source of services and information. Many users use a modem and dial-up lines to access the Internet from home or office. Recent developments in web technologies enable small programs, or applets, to be embedded in web pages. When a user views a web page, the applet is downloaded, along with other page contents, and then executed on the user's computer. Thus, in addition to interpreting and rendering the web page, the user's computer must also interpret and execute the applet, increasing the computational burden on the user's computer. The fact that many applets are highly graphical in nature only increases this burden.

An additional concern regarding computer communications is the lack of automatic security features. While software and hardware currently exists to encrypt data, much of it is expensive to obtain, or difficult to use, and is therefore restricted to use by large institutions. As a result only a small amount of inter-computer communications are encrypted.

In view of the above mentioned difficulties in the art, it would be desirable to provide a method of controlling modem hardware in a flexible, programmable manner that is largely independent of specific modem hardware and is therefore portable from one modem to another.

It would also be desirable to provide a means for assisting a host computer in interpreting a data stream and in executing programs or applets that may be embedded in the data stream.

It would also be desirable to provide a means of automatically providing for relatively secure inter-computer data communications.

SUMMARY OF THE INVENTION

The objects of the present invention are met by providing a modem in which new commands comprising small programs or "applets" may be loaded into the modem either from a host or a remote computer. The applets may then be invoked by the host or remote computers and executed by a processor within the modem itself. Because the applets are written in a high level language and encoded in a portable way, the applets may run on a wide variety of modem hardware configurations. In a preferred embodiment, the modem includes hardware or software access to a frame buffer of the host computer to increase the rate that applets can update screen images.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which.

Detailed Description of the Invention

Figure 1:
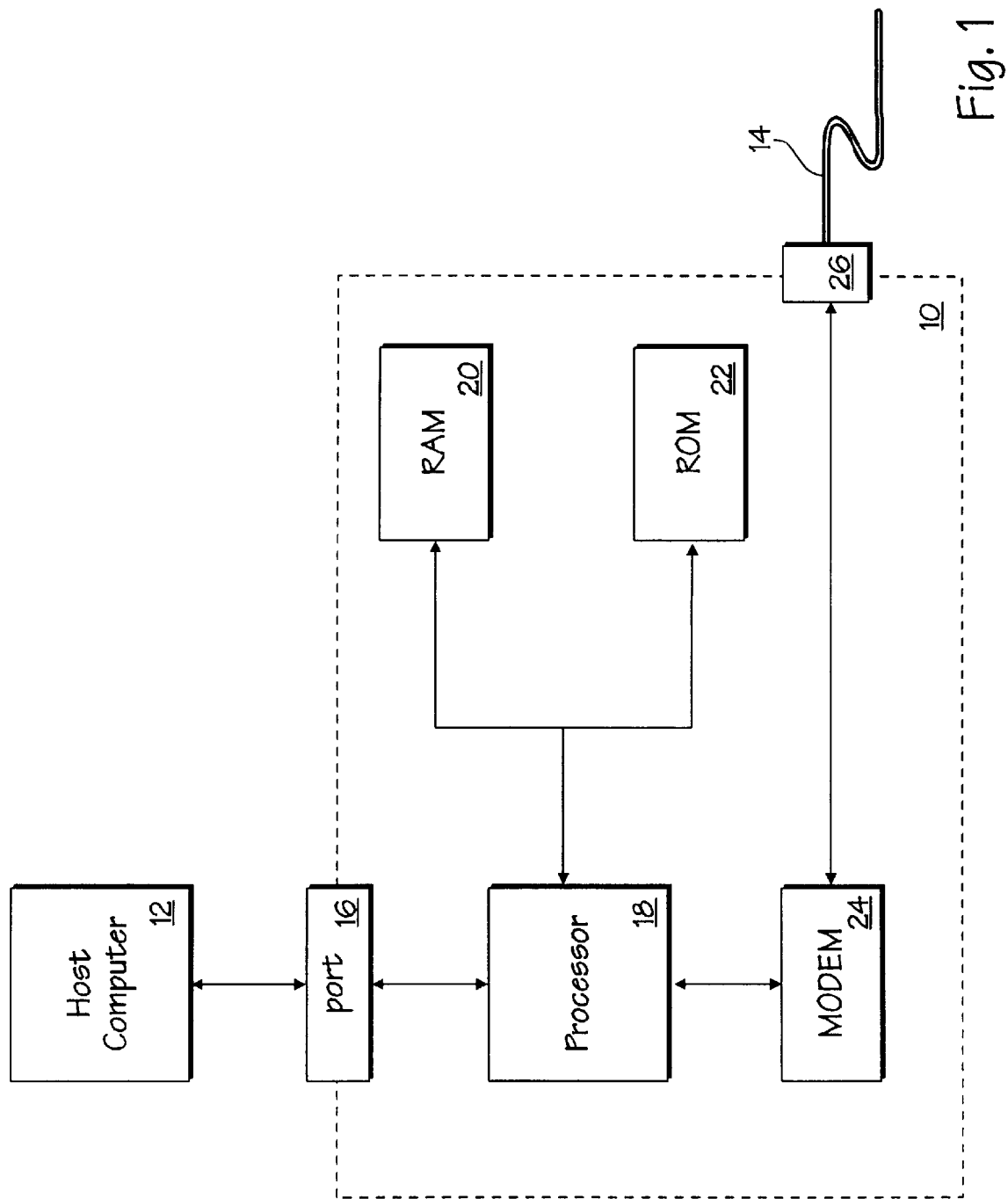
FIG. 1 is an illustrative block diagram of a software commanded intelligent modem in accordance with the principles of the present invention.

Referring to FIG. 1, software-controlled modem 10, constructed in accordance with the principles of the present invention is described. Modem 10 is shown coupled, via jack 26, to telephone line 14, which may be either an analog or digital phone line, via data port 16, and to host computer 12, which may be any general purpose computer such as an IBM AT-PC or Apple MACINTOSH type computer. Alternatively, host 10 may be a personal digital assistant (PDA), electronic organizer, pager, cellular telephone, or other device capable of performing user input and output functions.

Data port 16 provides a means of exchanging data between modem 10 and host computer 12 and may be any conventional interface such as a RS-232 (EIA-232) serial interface or a Enhanced Parallel Port (EPP) interface. Alternatively, modem 10 may be an add-in card for installation in an expansion slot of computer 10, wherein data port 16 may comprise an expansion bus interface. Similarly, jack 26 may be any jack compatible with connecting to telephone line 14, such as a standard RJ-45 type modular jack. Alternatively, jack 26 may be a generic jack or connector, and a special purpose adapter cable may couple the jack to telephone line 14.

Modem 10 also includes controller 18, RAM 20, ROM 22, and modem circuitry 24. Controller 18 controls the operation of modem circuitry 24 in accordance with program instructions stored in RAM 20 and ROM 22. Controller 18 may be any suitably powerful general purpose microprocessor, such as a 80386 class processor manufactured by Intel, Santa Clara, Calif. Alternatively controller may be a digital signal processor (DSP) such as a member of the 53600 DSP family manufactured by Motorola, Schaumburg, Ill.

RAM 20 provides storage for applets and a temporary scratchpad area for processor 18. RAM 20 may also include battery backed RAM for long term storage of applets and configuration parameters used by the modem software. ROM 22, which may include EEPROM or other type of alterable read only memory includes programming for controlling overall operation of modem 10, and for executing applets stored in RAM 20. Preferably, ROM 22 also includes programming for supporting standard modem command sets, such as the "Hayes AT" command set.

In a preferred embodiment of the present invention, ROM 22 includes program code implementing a virtual machine for execution of programs written in the Java programming language. The Java language is an general purpose, object-oriented computer language developed by Sun Microsystems specifically for networking applications, and is described in *Programming in Java!*, Tim Ritchey, New Riders Publishing, Indianapolis, Ind., 1995, which is incorporated herein in its entirety by this reference.

Applets written in the Java language are compiled into a machine independent, byte-coded "machine language" that is executed on the "Java virtual machine." Currently, Java virtual machines are software based, although a few processors have been announced that execute Java byte-codes directly.

Applets may be downloaded into modem 10 from host computer 12 by the host sending a "load applet" command to modem 10 followed by the compiled applet code itself. To provide maximum modem compatibility, the "load applet" command is, preferably, an extension of and compatible with existing modem command sets, such as the Hayes-AT command set. The downloaded applet code is stored in RAM 20, and a verification routine stored in ROM 22 is executed by processor 18 to verify and validate the downloaded code. This step assures that the code complies with the Java language definition and helps maintain system integrity and security.

Alternatively, modem 10 may load an applet from a remote computer or modem via telephone line 14. For example, it may be desired to connect host computer 10 to a computer at a bank, or other financial institution, for the purpose of conducting financial transactions. Using presently available technologies, data transmitted between host computer 10 and the bank's computer is transmitted in the clear (i.e. unencrypted) subjecting the data to theft or compromise.

Alternatively, custom software that encrypts the data being transferred may be executed on host computer 10 and the bank's computer. While this may minimize the chance of transferred data being compromised, the custom software typically only works with a specific remote site. Thus, software that works with one bank's computer may not work with another bank's computer. The user must then keep software for each remote computer that requires a secure data link. In addition, whenever the bank's software is changed or upgraded, the user must go through the process of installing new user software on host computer 10.

In accordance with the principles of the present invention, modem 10 may negotiate with a remote modem for the transfer of an applet, which may be an applet for data encryption. The negotiations may take place when a communications link is first established between modem 10 and the remote modem, or may be delayed until secure communications are specifically requested. Following the transfer negotiations, the applet is received from the remote modem and stored into RAM 22. The applet is then verified as described above. The verified code may then be executed as needed by processor 18.

Figure 2:
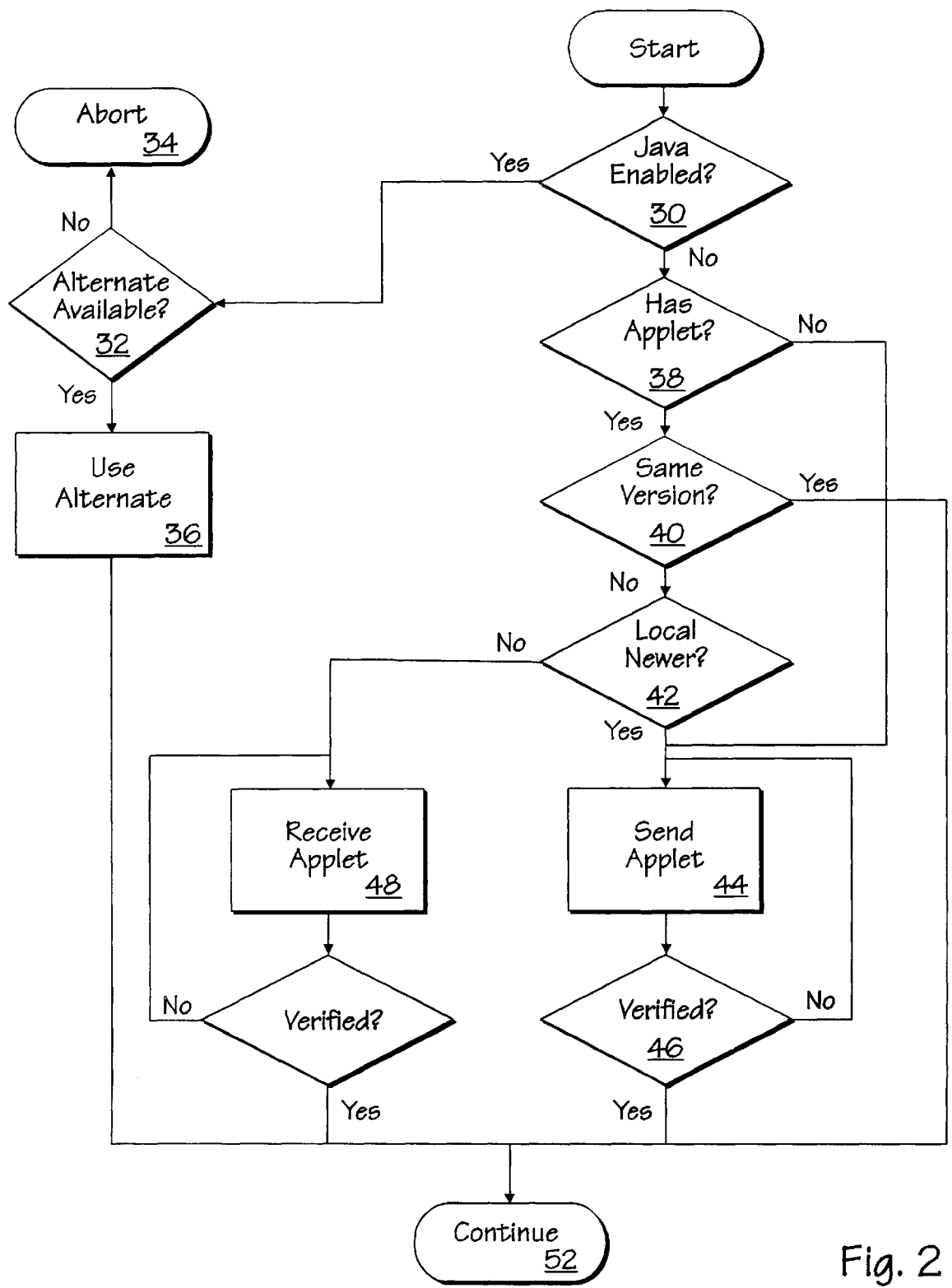
FIG. 2 is an exemplary flow diagram of the process of downloading an applet from a remote modem.

FIG. 2 shows an illustrative negotiation and transfer sequence for downloading an encryption routine. At step 30, modem 10 send a message to the remote modem inquiring if the remote modem is Java enabled. The remote modem may respond negatively indicating it is unable to receive applets because, for example, the remote modem is an old modem without the capability of downloading applets, or the download feature may be disabled. Alternatively, the request at step 30 may "timeout" indicating that the remote modem does not recognize the negotiation sequence. In any case, a negative or missing response to the Java request causes the sequence to proceed to step 32, wherein alternatives to using Java applets are considered. For example, applets written in another programming language may be used. Alternatively, a user may be given an opportunity to fix the problem (e.g. reenable applet downloading), to continue without downloading the applet, or to abort the process. If there are no alternatives to using Java applets the sequence aborts at step 34, otherwise, the alternative is used (step 36) and processing continues at step 52.

However, if the remote modem responds affirmatively to the Java request, then modem 10 inquires at step 38 if the remote modem has a specific applet, for example a particular encryption applet. If the remote modem responds "no" then modem 10 proceeds to step 44 and transmits the applet to the remote modem. If the remote modem has the requested applet, it responds by sending a "yes" along with the version number of the applet.

At steps 40 and 42, modem 10 determines if the applet on the remote modem is the same version as the applet used by modem 10, and if not, which modem has the newer version. If the versions are the same, then the negotiation is completed and processing continues at step 52. However, if the remote modem has a newer version of the applet, then at step 48 modem 10 downloads the newer applet from the remote modem, and verifies the applet at step 50. If the applet is verified then the sequence continues through step 52. Otherwise, modem 10 returns to step 48 and repeats the downloading process until verification is successful. Alternatively, if modem 10 has a newer version of the applet, the sequence proceeds to step 44 wherein modem 10 transmits the applet to the remote modem. The remote modem then notifies modem 10 of the results of verification. If verification was unsuccessful, then the applet is resent, otherwise, the sequence continues through step 52.

The sequence shown in FIG. 2 presents a generic outline of a negotiation sequence between intelligent modems according to the present invention. Clearly, embellishments may be made to the negotiation sequence shown in FIG. 2. For example, the loop, comprising steps 44 and 46, for sending an applet to the remote modem may include a test for limiting the number of attempts at sending the applet, thereby preventing modem 10 from getting stuck in the send loop. Or, for example, a test may be inserted between steps 40 and 42 to determine if both modems have a common version of the applet that the modems could use, even if it is not the latest version. This may save the overhead involved in transmitting a newer applet when a slightly older version of the applet is sufficient. One skilled in the art will recognize other modifications and embellishments which may be added to the negotiation sequence of FIG. 2.

Loading an applet from a remote modem provides a facility for automatic data encryption services. For example, any time a connection is established between modem 10 and a similar remote modem, the use of a data encryption applet may be negotiated. If the modems already contain the same version of the encryption applet then data transfers may begin. If, however, one of the modems lacks the encryption applet, or has an older, out-of-date version, the modems may negotiate to transfer the new version. Preferably, the newer version of the applet is cached or otherwise retained by modem 10 or host 12 for later use. Alternatively, applets may be discarded after use (i.e. after disconnecting). Thus, either the bank or the user may upgrade to a newer version of the security software without fear of incompatibility with older access software.

Security may be further enhanced by using encryption applets that are session unique. In other words each time modem communication link is established a different encryption applet is used. In addition to on-line banking, simple, robust, and strong security measures are a necessary first step to a wide range of on-line services and transactions.

Additionally, applets may be used to scan incoming data for potentially hazardous programs, such as virus, worm, or Trojan horse programs. These types of programs have the potential to damage both hardware and software resources on host computer 12. By automatically scanning data transferred through modem 10, the modem may discard the offending transfer or may alert the user to a potential rogue program.

Similarly, an applet may provide filtering of "junk e-mail" or other unwanted data. For example, an applet may search for e-mail headers in data received via telephone line 14 and discard any e-mail messages from a particular individual or has a specified 'subject:' line. Alternatively, an applet may prioritize incoming messages based on a user specified criteria, arranging to deliver the most urgent message first. This may be particularly useful in a mobile, radio-based, inter-computer communication environment.

The use of applets to control modem 10 provides for easy upgrades or updates of modem control software stored in the alterable portion of ROM 22. For example, if modem 10 connects to a remote modem having a different modem communications protocol, the two modems may negotiate to transfer an applet for the better protocol (i.e. newer, or faster, or more robust). Thus, the modem having older software is updated to the latest version.

Special flags or data values within each applet may be used to indicate various information about the applet. A first flag may indicate that the applet is not transferrable and a modem should not transfer such an applet to another modem. Another flag may indicate that the applet should not be cached. For example, a session encryption applet should not be cached because it will not be used again in a future session.

Alternatively, a data value may be used as a counter or expiration date for an applet. Each time the applet is used the counter is decremented or the date is checked against the expiration date. If the counter reaches zero or the expiration date is passed then the applet is not run, and may be removed from RAM 20 or ROM 22. This provides a means for a user to "test drive" an applet before purchase, while protecting the interests of the seller/developer of the applet. Through judicious use of the 'transferrable' and the 'cacheable' flags, as well as the expiration counter, an applet author can ensure that an applet receives wide distribution, for trial use by potential customers.

Figure 3:
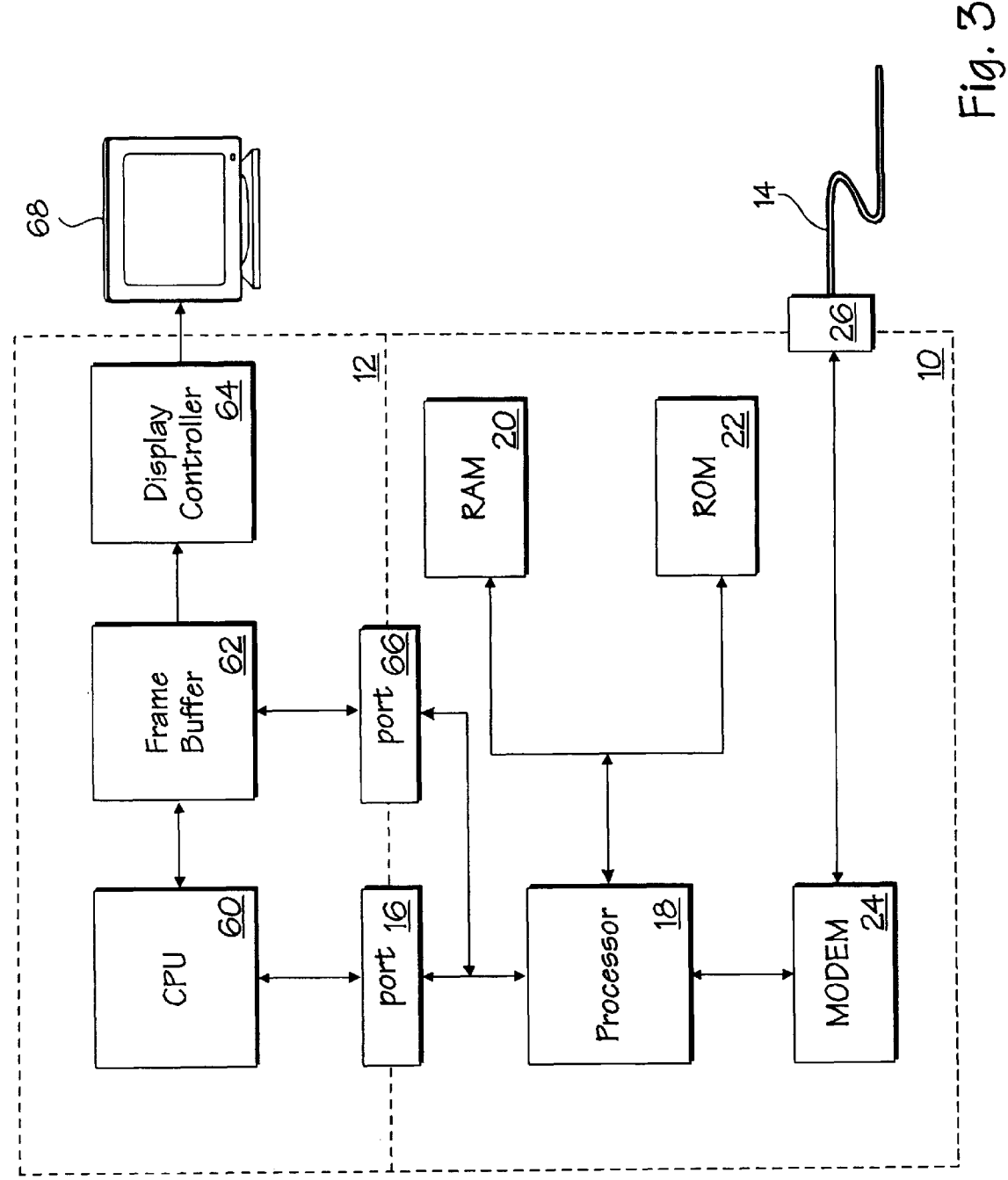
FIG. 3 is an illustrative block diagram of an exemplary host computer and modem, including a dedicated interface between the modem and a frame buffer of the host computer.

Referring now to FIG. 3, an alternative illustrative embodiment of the present invention is described. Host computer 12 includes CPU 60, frame buffer 62, display controller 64, and display 68. Modem 10 contains the same components as described above in connection with FIG. 1. In addition, modem 10 also includes video interface 66 coupled to frame buffer 62. Alternatively, video interface 66 may instead couple processor 18 to display controller 64.

In a preferred embodiment of the present invention video interface 66 comprises a standard interface such as a VGA feature connector or the Zoomed Video port described in the CardBus specification (similar to PCMCIA). Alternatively, data port 16 and video interface 66 may comprise a conventional high speed data bus, such as VESA local bus or PCI bus, wherein high speed device drivers and DMA or bus mastering techniques may be used to transfer video data between modem 10 and frame buffer 62.

Video interface 66 provides processor 18 with accelerated access to frame buffer 62. Without video interface 66, graphical data from applets executing on modem 10 need to be transferred to frame buffer via CPU 60, slowing display updates. However, with video interface 66, graphical applets executing on modem 10 may access frame buffer 62 directly, thereby providing rapid screen updates. For example, modem 10 may execute a Java applet that creates a short animation sequence. Without video interface 66, the animation might appear slow and jerky due to the relatively low data rate available between processor 18 and frame buffer 62 via CPU 60. However, in accordance with the principles of the embodiment of FIG. 3 of the present invention, video interface 66 provides direct access from modem processor 18 to frame buffer 62. Thus, an animation may appear more quickly and smoothly, with fewer dropped frames.

In addition, video interface 66 may provide improved response for live video, such as video conferencing, video phone, or whiteboard type applications. In these instances, modem processor 18 may intercept an incoming video image, decode the image, and send it directly to the frame buffer, instead of transmitting the data to the host CPU. Processor 18 may also capture a portion of an image from frame buffer 62 for transmission to a remote computer.

While the preferred embodiment of the present invention has been disclosed in terms of an intelligent, software based modem, other embodiments are contemplated. For example, analog modem circuitry 24 may instead comprise circuitry implementing a digital line connectors, a packet radio transceiver, a local area network connector, or cable modem. Obviously, in each instance, telephone line 14 would instead be the corresponding transmission medium, e.g. coaxial cable for a cable modem.

Similarly, software languages other than the Java may be used. The Java language is currently popular for use in networked devices and is therefore a good choice for the present invention. However, other languages and standards are emerging in the field of inter-computer communications which may used in the context of the present invention.

One skilled in the art will appreciate that the present invention may be practiced by other than the described embodiments, which are presented for purposes of illustration and not of limitation.

What is claimed is:

1. A data communication device to transmit and receive data between a host device and a remote device, separate from the data communication device, the data communication device comprising:

an interface to the host device for the transfer of data there between;

modem circuitry having a first port connected to a processor of the host computer and a second port connected with the frame buffer of the host computer, said modem circuitry receives a Java applet comprising a sequence of Java byte codes;

a first memory for storing a Java applet comprising a sequence of Java byte codes; and processor circuitry, separate from the host and remote devices, for executing the Java applet, the processor circuitry coupled to the interface, the first memory, and the modern circuitry.

2. The data communication device as defined in claim 1 wherein the modem circuitry comprises circuitry selected from a group consisting of a telephone modem, a cable modem, a digital line interface, a local area network interface, and a packet radio transceiver.

3. The data communication device as defined in claim 1 wherein the processor circuitry is further programmed for receiving the Java applet from the host device and storing the received Java applet in the first memory.

4. The data communication device as defined in claim 1 wherein the processor circuitry is further programmed for receiving the Java applet from a remote device via the modem circuitry and storing the received Java applet in the first memory.

5. The data communication device as defined in claim 1 further comprising a second memory coupled to the processor, the second memory being a non-volatile memory, the processor being further programmed to transfer the Java applet from the first memory to the second memory.

6. The data communication device as defined in claim 1 further comprising a video port for coupling the processor to a display subsystem of the host device for the transfer of images therebetween.

7. The data communication device as defined in claim 1 wherein the processor circuitry comprises a special purpose processor which executes the Java byte codes directly in hardware.

8. The data communication device as defined in claim 1, wherein the processor circuitry comprises a general purpose processor, and a nonvolatile memory, the nonvolatile memory including programming for an interpreter of the Java byte codes, the general purpose processor using the interpreter to execute the Java byte codes.

9. A data communication device to transmit and receive data between a host device and a remote device, separate from the data communication device, the data communication device comprising:

an interface to the host device for the transfer of data there between;

modem circuitry having a first port connected to a processor of the host computer and a second port connected with the frame buffer of the host computer, said modem circuitry receives a Java applet comprising a sequence of Java byte codes;

a first memory for storing the Java applet; and processor circuitry, separate from the host and remote devices, coupled to the interface, the modem circuitry, and the first memory, the processor circuitry being programmed to execute the Java applet to control transmission and reception of data between the host device and the remote device.

10. The data communication device as defined in claim 9 wherein the processor circuitry comprises a special purpose processor which executes the Java byte codes directly in hardware.

11. The data communication device as defined in claim 9, wherein the processor circuitry comprises a general purpose processor, and a nonvolatile memory, the nonvolatile memory including programming for an interpreter of the Java byte codes, the general purpose processor using the interpreter to execute the Java applet.

12. The data communication device as defined in claim 9 wherein the Java applet controls transmission and reception of data between the host device and the remote device by providing a security function.

13. The data communication device as defined in claim 12 wherein the security function provides encryption of the data transferred between the host device and the remote device.

14. The data communication device as defined in claim 12 wherein the security function scans the data transferred between the host device and the remote device for computer viruses.

* * * * *